United States Patent [19]

Houseman

[11] 4,041,910
[45] Aug. 16, 1977

[54] COMBUSTION ENGINE

[75] Inventor: John Houseman, Pasadena, Calif.

[73] Assignee: The United States of America as represented by the Administrator of the National Aeronautics and Space Administration, Washington, D.C.

[21] Appl. No.: 564,622

[22] Filed: Apr. 2, 1975

[51] Int. Cl.² .......................................... F02B 75/20
[52] U.S. Cl. ................................ 123/59 EC; 123/3; 123/37; 123/119 A; 123/122 AB; 123/DIG. 8
[58] Field of Search ................ 123/1 R, 37, 59 EC, 123/122 G, 122 AB, 59 PC, DIG. 8, 119 A; 60/278, 279, 620

[56] References Cited

U.S. PATENT DOCUMENTS

| 1,490,604 | 4/1924 | Evelyn | 123/122 AB |
|---|---|---|---|
| 2,113,602 | 4/1938 | Pratt | 123/59 EC X |
| 3,030,819 | 4/1962 | Edelbrock | 123/59 PC |
| 3,426,524 | 2/1969 | Straub | 60/620 X |
| 3,717,129 | 2/1973 | Fox | 123/3 X |
| 3,789,807 | 2/1974 | Pinkerton | 123/59 EC X |
| 3,805,752 | 4/1974 | Cataldo | 123/59 EC X |
| 3,896,774 | 7/1975 | Siewert | 123/59 EC |
| 3,924,576 | 12/1975 | Siewert | 123/59 EC X |

Primary Examiner—Carroll B. Dority, Jr.
Assistant Examiner—Craig R. Feinberg
Attorney, Agent, or Firm—Monte F. Mott; Wilfred Grikfa; John R. Manning

[57] ABSTRACT

An arrangement for an internal combustion engine is provided in which one or more of the cylinders of the engine are used for generating hydrogen rich gases from hydrocarbon fuels, which gases are then mixed with air and injected into the remaining cylinders to be used as fuel. When heavy load conditions are encountered, hydrocarbon fuel may be mixed with the hydrogen rich gases and air and the mixture is then injected into the remaining cylinders as fuel.

5 Claims, 4 Drawing Figures

COMBUSTION ENGINE

ORIGIN OF THE INVENTION

The invention described herein was made in the performance of work under a NASA contract and is subject to the provisions of section 305 of the National Aeronautics and Space Act of 1958, Public Law 85-568 (72 STAT. 435; 42USC457).

BACKGROUND OF THE INVENTION

This invention relates to an improved method and means for operating an internal combustion engine so that it provides, using some of its cylinders, a hydrogen rich gas which can then be used as a fuel by the remaining cylinders.

A vast amount of research is being directed toward eliminating the nitric oxide (NO$_x$) emissions from internal combustion engines and also for improving the efficiency of the operation of an internal combustion engine. It has been found that when hydrogen is mixed with a hydrocarbon fuel, a much leaner ratio of hydrocarbon fuel to air can be used in the internal combustion engine than would otherwise be possible, in view of the fact that the hydrogen can support combustion whereas a lean ratio of hydrocarbon fuel and air cannot support combustion. It has also been found that when the ratio of hydrocarbon fuel to air is "lean" beyond a certain point, then the amount of NO$_x$ produced as a result of a use of the mixture in an internal combustion engine is substantially eliminated. Thus lean operation results in a low flame temperature which yields low NO$_x$.

In a patent application Ser. No. 387,342, filed Aug. 10, 1973 by Jack Rupe entitled System for Minimizing Internal Combustion Engine Pollution Emission, there is described and shown an arrangement for generating hydrogen and mixing the hydrogen with a hydrocarbon fuel and air and then injecting them into an internal combustion engine whereby the amount of NO$_x$ produced by the internal combustion engine is substantially reduced. In that application there is described and shown a hydrogen generator which produces the hydrogen for use in the internal combustion engine.

In an application for a hydrogen rich gas generator, Ser. No. 428,444, filed Dec. 28, 1973, by this inventor, there is described an arrangement for a hydrogen rich gas generator for generating gases required in the system for the type which has been described. While these hydrogen gas generators are effective for the intended purpose, they constitute an auxiliary piece of equipment, requiring peripherial service equipment such as a starting system, an air pump, etc. If a source of hydrogen rich gases can be provided without such auxiliary equipment, there could be a savings in cost and a simplification of the equipment.

In a patent to Mikulasek et al., U.S. Pat. No. 2,648,317, there is shown an arrangement for using at least one piston of an internal combustion engine into which vaporized hydrazine is injected. The piston of the cylinder is allowed to compress the mixture. Then the hydrazine is detonated by an electric discharge for the purpose of being decomposed into hydrogen, nitrogen and ammonia. The decomposition products of the hydrazine are then mixed with air to form a further explosive mixture which, when ignited, produces pressure and releases heat to be transformed into mechanical energy. The problem with the arrangement described and shown in the patent, is that hydrazine decomposes very rapidly and provides a very violent reaction which is extremely explosive and almost impossible to control. Furthermore, according to the patent, for mixing air with the decomposed products of hydrazine, a high pressure source of air is required. Since a high pressure air compressor is expensive to operate, this adds to the cost of the system.

Hydrazine is classified as a corrosive liquid, and must be carefully transported under a special label. Consequently the invention described in the patent is not believed practical for automotive application as it is much too dangerous to have any hydrazine on board.

OBJECT AND SUMMARY OF THE INVENTION

An object of this invention is the provision of a method and means for operating an internal combustion engine from a hydrocarbon fuel which substantially eliminates nitrous oxide and hydrocarbon emissions.

Another object of this invention is the provision of a more efficient method for operating an internal combustion engine which also substantially eliminates nitrous oxides and hydrocarbon emissions.

A further object of this invention is to provide a simplified method and means for using an internal combustion engine for generating a hydrogen rich gas from hydrocarbon fuel, which can then be used as fuel for the remaining portion of the engine.

Yet another object of this invention is to provide a novel and safe method and means for using an internal combustion engine for generating a hydrogen rich gas from a hydrocarbon fuel which avoids the danger of an explosion.

The foregoing and other objects of the invention are achieved by mixing a hydrocarbon fuel such as gasoline, and air and injecting them into one or more cylinders of an internal combustion engine. Exemplary throughout this application are two cylinders. The pistons in the cylinders are permitted to compress the mixture of air and fuel. The amount of air mixed with the hydrocarbon fuel in a fuel rich carburetor is only sufficient to cause a partial oxidation of the fuel so that when the compressed mixture is ignited by a spark, it will not decompose, but rather it is only partially oxidized to provide hydrogen (H$_2$) and carbon monoxide (CO) principally, along with other products of the partial oxidation.

The resulting gas mixture, hereafter termed a hydrogen rich gas, is then mixed with air and injected into the remaining cylinders of the internal combustion engine to be ignited by the spark plugs and is used in the well known manner of fuel to power the engine. The amount of air mixed with the hydrogen rich gas in a "lean carburetor" prior to injection in the remaining cylinders is the amount required for completing oxidation, whereby the hydrogen forms H$_2$O and the carbon monoxide forms CO$_2$. Some excess of air, up to a maximum of 30%, is beneficial for better fuel economy and low NO$_x$. For all normal operation, where a great deal of power is not required, the output of the engine driven by the hydrogen rich gas is adequate. However, if more power should be desired, the lean carburetor may be fed gasoline, which is mixed with the hydrogen rich gas and air. The control required for feeding the lean carburetor liquid fuel may be a foot pedal control, and is operated in the same manner as where a foot pedal is depressed all the way to provide additional power in present day motor cars.

The novel features of the invention are set forth with particularity in the appended claims. The invention will best be understood from the following description when read in conjunction with the accompanying drawings.

BRIEF DESCRIPTION OF THE DRAWINGS

FIGS. 4 and 5 are schematic drawings showing other arrangements of a prechamber internal combustion engine modified in accordance with this invention.

DESCRIPTION OF THE PREFERRED EMBODIMENTS

In tests using the Federal test gasoline, "Indolene", it has been found that at an air/fuel ratio of 14.65, all of the fuel is converted to $CO_2$ and $H_2O$. As the air/fuel ratio is reduced, $H_2$ and CO start to form. In theory, soot ($C_s$) should not start to form until an air/fuel ratio of 5:5 is reached. Soot suppression can be obtained by adding water, however, it is desirable to use an air/fuel ratio in which a substantial amount of $H_2$ and CO are produced without producing soot and without adding water. This is what is accomplished by the present invention.

Figure 1:
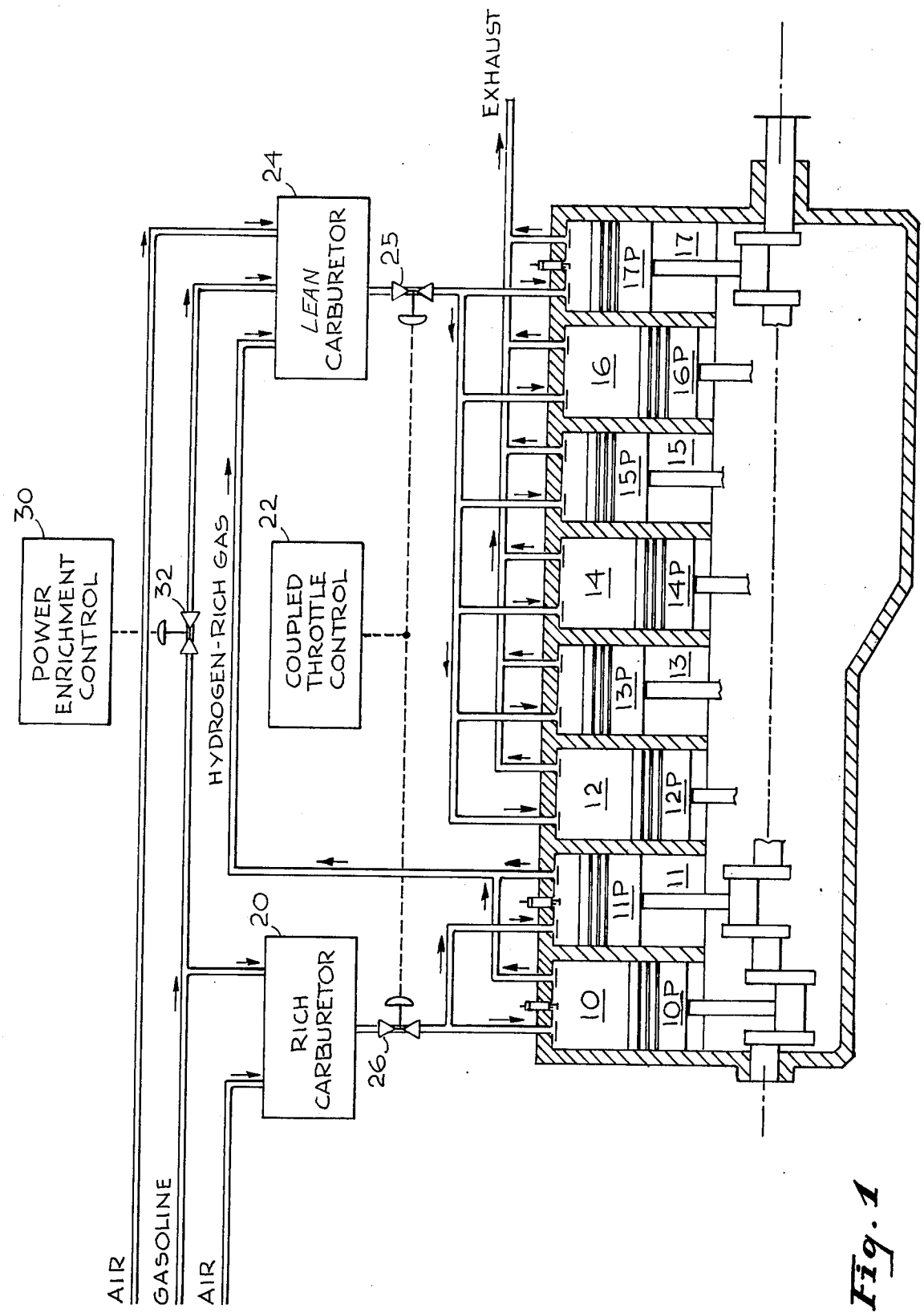
FIG. 1 is a schematic drawing of an arrangement of an internal combustion engine in accordance with this invention.

Referring now to FIG. 1, a schematic drawing of an internal combustion engine, by way of example, an 8 cylinder engine, is shown, which is modified in accordance with this invention. The 8 cylinders respectively 10 through 17, each has a piston therein, respectively 10P through 17P. By way of example, and not to serve as a limitation upon the invention, two of the cylinders are assigned the function of generating hydrogen rich gas as well as part of propulsion power, and the remaining 6 cylinders provide the rest of the propulsion for the engine. A carburetor 20, designated as a "rich carburetor", is used to mix hydrocarbon fuel and air for the gas generating cylinders. It demand feeds the mixture to the cylinders 10, 11 under control of a "coupled throttle control" 22, which also controls the mixture fed from a lean carburetor 24 into the gas using cylinders 12 through 17.

The coupled throttle control 22, which can be the well known foot pedal, for example, exercises control over the mixture fed to cylinders 10, 11 by controlling a valve 26. This determines the amount of the "rich" gasoline-air mixture admitted into the gas generating cylinders. An air fuel mass ratio in the range of 7 through 11 is preferred. The coupled throttle control also demand controls a valve 25 to determine the amount of mixture fed to the remaining cylinders of the engine.

The pistons 10P and 11P enable intake of the rich mixture on a downstroke, and then compress it. Upon the completion of the compression stroke, the mixture is ignited by a spark plug (not shown) in the usual fashion, generating heat which causes a rapid expansion of the gases, driving the pistons downwardly to generate power to also form $H_2$ and CO among other gases. The hydrogen rich gases are evacuated on the next compression stroke of the cylinders and are fed to the lean carburetor 24. There, except when a surge of power is required, the hydrogen rich gas is only mixed with air. This time a "lean" air fuel mixture is used. The overall air/fuel mass ratio of the engine is in the range of 15 to 20. As previously pointed out, when emergency power is required, e.g., when passing or when getting into a freeway, then the power enrichment control 30 is actuated, which opens valve 32 to enable gasoline to be supplied to the lean carburetor. There it is mixed with the hydrogen rich gas and air.

The output of the lean carburetor 24 is then applied, in well known fashion, to the gas using cylinders 12 through 17 to be ignited and to be converted into more useful power. The exhaust products from the respective pistons are removed in the normal fashion for internal combustion engine.

Because the rich and lean carburetor throttle valves 25 and 26 are coupled to the same control (coupled throttle control or accelerator) constant equivalent ratios in both rich and lean cylinders is assured, essentially independently of load and rpm (except for power enrichment with gasoline which increases the equivalence ratio in the lean cylinders.) It will be obvious that the lean and rich carburetor throttle valve 25 and 26, as well as the valve 32 can be set to adjust the amount of the mixtures which are passing therethrough. This is well known in the use of a hydrogen rich gas, instead of gasoline as a fuel poses no new problems in the art. It should be noted that the 8 cylinders of the schematically illustrated engine are all connected to the same crank shaft (not shown) and it is not intended that there be any changes in the arrangement of the spark plugs, spark ignition control, fuel distribution, injection and/or exhaust, of a standard internal combustion engine, other than what is shown in the drawings. Essentially the modifications shown comprise the use of the rich and lean carburetors with a coupled throttle control, power enrichment control and the fuel feed arrangements wherein hydrogen generation occurs in one or more cylinders. The exhaust from these cylinders are connected to the lean carburetor, which then feeds the other cylinders either with or without additional gasoline.

In order to maximize the hydrogen rich gas production, the air/fuel ratio used to produce the hydrogen rich gas should be as low as possible. This is normally limited by the onset of soot formation. The exact air/fuel ratio at which soot formation starts varies considerably from engine to engine and depends on the degree of atomization and the uniformity of mixing of the fuel and the air.

It has been found that by either vaporizing the fuel and mixing it with preheated air, prior to induction into the hydrogen rich gas generating cylinders or by the introduction of some of the exhaust from the propulsion cylinders which contain water, into the hydrogen rich gas generating cylinders, or by the actual addition of steam or water, soot formation can be prevented, thus allowing air/fuel ratios down to as low as 6.5.

Figure 2:
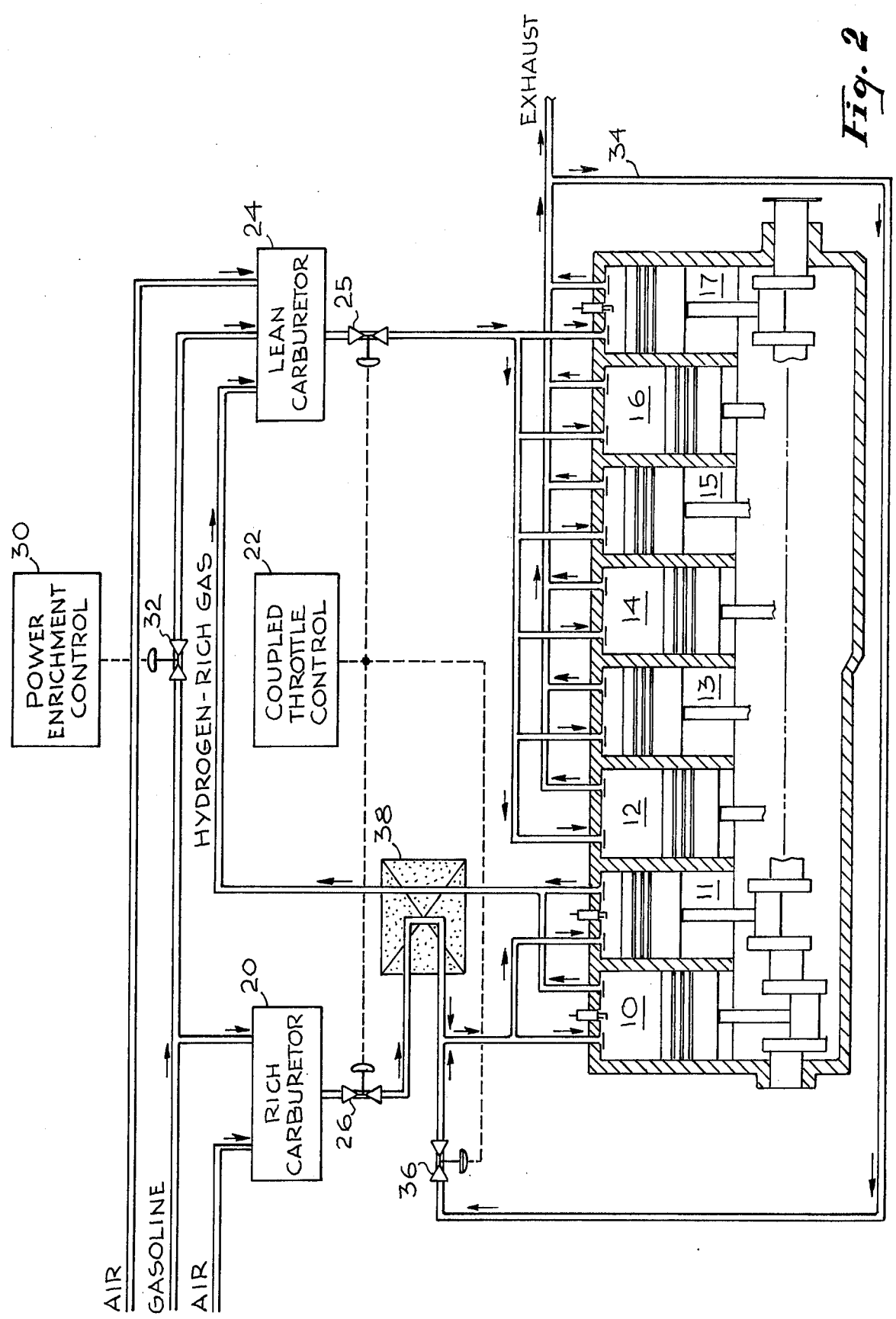
FIG. 2 illustrates another arrangement of an internal combustion engine in accordance with this invention.

FIG. 2 shows schematically, an arrangement of an internal combustion engine which recirculates the exhaust from the propulsion cylinders and preheats the vaporized air/hydrocarbon fuel mixture to improve the hydrogen rich gas output. Similar functioning structure as is shown in FIG. 1 will receive the same reference numerals.

A portion of the exhaust of cylinders 12 through 17 is returned over a line 34 and through a control valve 36, to be mixed with the incoming air/hydrocarbon mixture, which is being injected into the hydrogen rich gas generating cylinders. The valve 36 is under the control of the coupled throttle control 22. The line extending from the control 26 of the rich carburetor down to the hydrogen rich gas generating cylinders passes through a heat exchanger 38. The heat exchanger absorbs the heat from the hot hydrogen rich gases, which are the output of the cylinders 10 and 11, and transfers this heat to the line extending from the control valve 26 which is delivering the rich mixture of hydrogen fuel and air to the hydrogen gas generating cylinders thereby preheating the rich mixture and vaporizing the fuel.

Hydrogen enrichment produces the best fuel economy with an engine that is a so-called lean burning engine. This means that gasoline can be burned at high air/fuel ratios. The leanest engine currently available commercially is a pre-chamber stratified charged engine made by the Honda Motor Company. Several other companies have similar engines under active development. It operates up to air/fuel ratio of 22 at high speeds, and over a ratio of 16 to 20 at lower speeds. In accordance with this invention, this engine can be converted to provide internal hydrogen generation to enable it to be operated using an ultra lean region of air/fuel ratios of up to 30.

Figure 3:
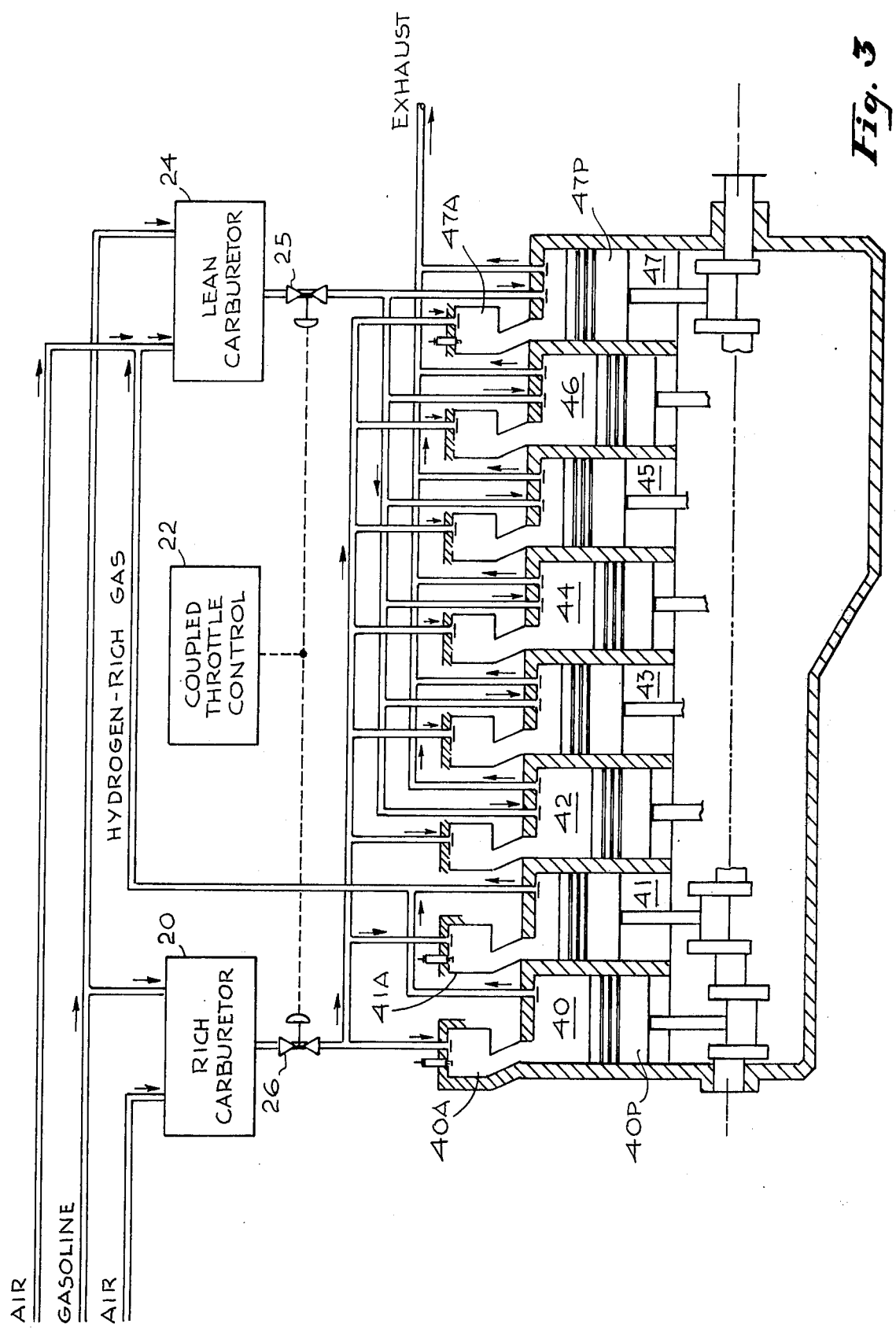
FIG. 3 is a schematic drawing showing an arrangement of a prechamber type of engine modified in accordance with this invention.

FIG. 3 is a schematic arrangement of a prechamber stratified charge engine which has been modified, in accordance with this invention, to internally generate a hydrogen rich gas which is subsequently burned as the fuel of the engine.

With each chamber or cylinder 40 through 47 of the stratified charged engine, there is an associated prechamber 40A through 47A. Each cylinder has a piston therein respectfully 41P through 47P. As before, there is a coupled throttle control 22 which operates the control valves 25 and 26 to control the amount of fuel being supplied from the respective rich carburetor and lean carburetor. The rich carburetor normally delivers a rich mixture to the prechambers 40A through 47A while the lean carburetor normally delivers a lean mixture to the main chambers 42 through 47. Each prechamber has its own inlet valve for the rich charge as well as a spark plug. Each main chamber has its own inlet valve and exhaust valve. A compression stroke of the piston in a main chamber also compresses a mixture in the prechamber to the same degree. Upon completion of a compression stroke the mixture in the prechamber is ignited.

When the mixtures in each of the hydrogen generating prechambers 40A and 41A, and main chambers 40 and 41, are ignited a hot hydrogen rich gas is generated. Also, power is produced during the expansion of this gas in the main chambers 40 and 41. On the exhaust stroke the hydrogen rich gas is fed to the lean carburetor where it is mixed with air and hydrocarbon fuel. Thereafter, the mixture is demand fed through control valve 25 into the respective main chambers 42 through 47 of the stratified charge engine. When the rich mixture which is introduced in usual fashion into the prechambers 42A through 47A, is ignited, not only is some additional hydrogen rich gas generated but, because of its high temperature it ignites and mixes with the mixture which was injected into an associated main chamber from the lean carburetor, thereby providing more power for the piston down stroke.

This prechamber engine is normally shown as a 4 cylinder engine by foreign manufacturers. In that case, 1 of the 4 cylinders may be devoted to generating a hydrogen rich gas together with the remaining three prechambers. However, the engine is shown here as an 8 cylinder engine, since making an 8 cylinder engine is normally the case in the United States. The only change that has to be made to this type of engine, in accordance with this invention, is to plug the main cylinder inlet valve for the cylinders which are used for hydrogen rich gas generation and to modify the exhaust manifold from these cylinders so that the hydrogen rich combustion products from these two cylinders is taken to the lean carburetor air inlet line. The lean carburetor can then be adjusted to operate in the ultra lean region of air/fuel ratios of 20 to 30. It should be noted that the lean carburetor as well as the rich carburetor is being fed gasoline at all time. However, the amount of gasoline fed to the lean carburetor is much less than would otherwise be used, in view of its being mixed with hydrogen rich gas. This is evidenced by the fact that the air/fuel ratio is raised between 20 and 30.

Figure 4:
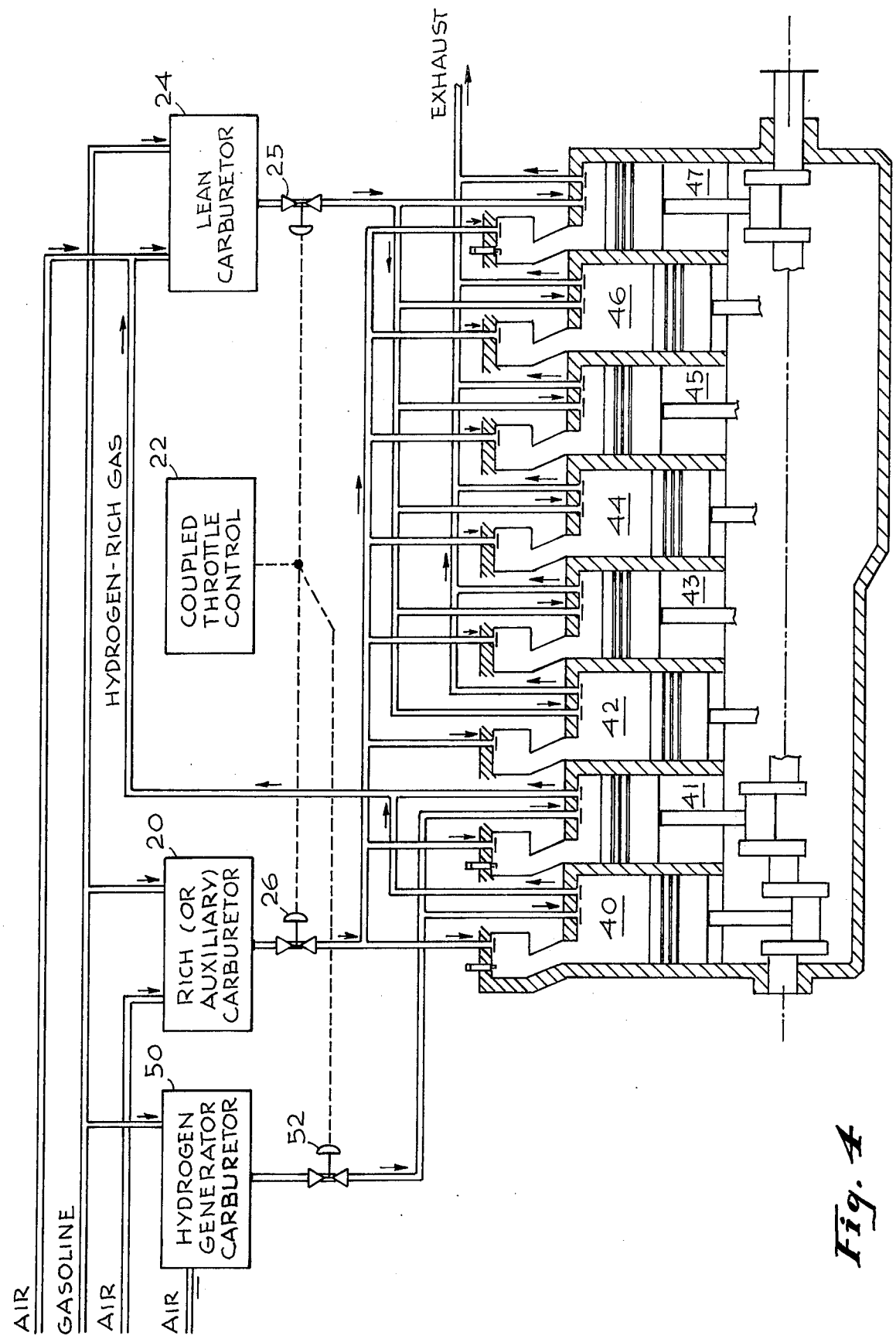

In order to overcome a possible problem of the hydrogen gas generating cylinders receiving an insufficient charge at high rpm, the main chamber inlet valves of the hydrogen gas generating cylinders 40 and 41 may be connected to receive a charge from the rich carburetor directly as well as the charge coming through the associated prechambers. However, to insure that the main chambers of the hydrogen rich gas generating cylinders receive the optimum mixture, an arrangement, such as is shown in FIG. 4, may be employed. Here, a special carburetor designated as a hydrogen generator carburetor 50 is shown, with its own control valve 52, also controlled by the coupled throttle control 22.

Should soot suppression prove to be a problem the techniques previously described and shown in connection with FIG. 2 may be used, namely lean exhaust gas recirculation as well as preheating of the incoming rich fuel mixture to the hydrogen gas generating cylinders.

This invention overcomes one of the disadvantages of previous systems wherein an independent hydrogen rich gas generator separately generates hydrogen gas from a hydrocarbon fuel. There about 20% of the energy in the fuel is lost in making a hydrogen rich gas. In this invention, the heat released during the production of the hydrogen rich gas is converted into mechanical power. Thus the 20% energy loss has been eliminated. Another way of expressing this is to say that this invention provides a 100% efficient generator of hydrogen rich gas compared to an 80% efficient generator described in previous systems. Tests have shown an increase in fuel economy of the order of 10% over the conventionally operated engine.

Another advantageous feature of this invention is the extremely low hydrocarbon emission when running on hydrogen rich gas only (i.e., without gasoline enrichment in the lean cylinders). The reason for this phenomenon is that there is no hydrocarbon fuel entering the lean cylinders, so there is no HC emission either. When gasoline enrichment is used, the HC emissions are similar to a conventional engine.

There has accordingly been described and shown herein a novel, and useful method and means for using one or more cylinders of an internal combustion engine for generating a hydrogen rich gas which is then used by the remaining cylinders of the engine as fuel. Not only does this arrangement minimize the presence of $NO_x$ and hydrocarbons but it also provides for a more efficiently operated engine.

What is claimed:

1. In an internal combustion engine of the type that has a plurality of cylinders each cylinder having a reciprocating piston, an intake means for enabling the timed introduction of fuel within each of said cylinders, an exhaust means for enabling the timed exhausting of the contents of each of said cylinders, and spark plug means for igniting fuel within each said cylinders, the improvement comprising rich carburetor means for forming a first mixture of a hydrocarbon fuel with only enough air to partially oxidize said hydrocarbon fuel when ignited, first means for introducing said first mixture into one of said cylinders from said rich carburetor means through its intake means to be compressed and ignited by operation of said internal combustion engine whereby hydrogen rich gases are formed in said one of said cylinders, said first means including first valve means for determining the amount of said first mixture introduced into said one of said cylinders, lean carburetor means for forming a second mixture of hydrogen rich gases and enough air to fully oxidize said hydrogen rich gases, means for transferring hydrogen rich gases from said one of said cylinders to said lean carburetor means, second means for introducing said second mixture into the remaining cylinders of said engine through their intake means for use as a fuel, said second means including a second valve means for determining the amount of said second mixture introduced into the remaining cylinders of said engine, and a throttle control means coupled to both said valve means for simultaneously controlling the respective amounts of first and second mixtures passed by both said valve means.

2. In an internal combustion engine as recited in claim 1 wherein there is included means responsive to an overload demand on said engine for enabling a hydrocarbon fuel to be introduced into lean carburetor means to be mixed thereby with said hydrogen rich gas and air.

3. In an internal combustion engine as recited in claim 1 wherein there is included heat transfer means heat coupling said means for transferring hydrogen rich gases to said first means for introducing said first mixture for heating said first mixture with heat from said hydrogen rich gases.

4. In an internal combustion engine as recited in claim 1 wherein said first means introducing said first mixture into said one of said cylinders includes a prechamber in communication with said one of said cylinders and into which said first mixture is introduced to flow therefrom into said one of said cylinders.

5. In an internal combustion engine as recited in claim 1 wherein for each cylinder, there is an associated prechamber having a passageway communicating with its cylinder, a third means for introducing said first mixture into each one of said prechambers from said rich carburetor means, and a means for introducing a hydrocarbon fuel into said lean carburetor means to be mixed with said hydrogen rich gas and air.

* * * * *